Nov. 18, 1952   K. K. K. KROYER   2,618,258
COOKING UTENSIL
Filed Sept. 28, 1948
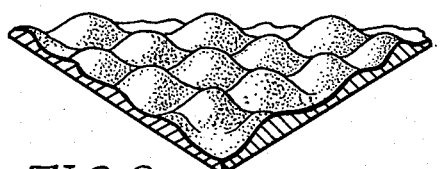
FIG.8
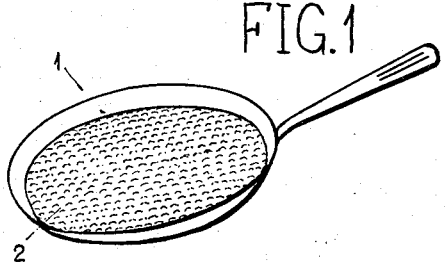
FIG.1
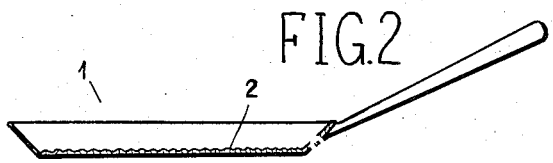
FIG.2
FIG.3
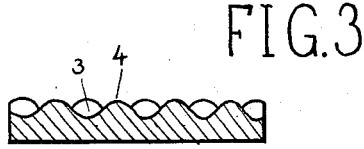
FIG.4
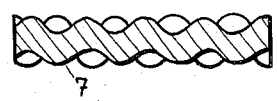
FIG.5
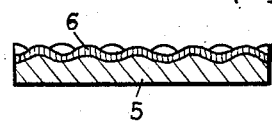
FIG.6
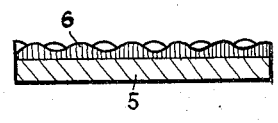
FIG.7
INVENTOR
KARL K. K. KROYER
BY Young, Emery & Thompson
ATT'ys Patented Nov. 18, 1952

2,618,258

UNITED STATES PATENT OFFICE 2,618,258

COOKING UTENSIL

Karl Kristian Kobs Kroyer, Aarhus, Denmark

Application September 28, 1948, Serial No. 51,525
In Denmark June 8, 1948

1 Claim. (Cl. 126—390)

My invention relates to cooking utensils, and more particularly to frying pans and other utensils having a frying surface.

One object of the invention is to provide a utensil of the character referred to in which frying may be performed with a smaller amount of fat than in ordinary frying pans, or in some cases without any fat at all, without danger of scorching of the food being fried.

Another object of the invention is to provide a frying utensil in which a more uniform frying can be obtained than with frying pans of conventional design.

A still further object of the invention is to construct the frying surface of a utensil of the character referred to in such a manner that a more advantageous heat transfer from the frying surface to the food being fried is obtained than has hitherto been possible.

Also among the objects of the invention is the provision of a frying utensil having a frying surface of undulated configuration and of reduced heat conductivity to secure efficiency in heat transfer in conjunction with a more uniform heat distribution.

With these and other objects in view which will appear as the description proceeds the invention consists in the novel arrangements and combinations described by the way of illustration in the following description and defined in their general aspect in the appended claim.

Reference will now be had to the accompanying drawing, in which

Fig. 1 is a perspective view of one form of a frying pan constructed in accordance with my invention, Fig. 2 is a vertical diametrical section through same, Figs. 3–7 are fragmentary sectional views on a larger scale of various forms of frying surfaces constructed in accordance with my invention, and Fig. 8 is a fragmentary perspective view of the frying surface.

In the drawings I have shown a frying pan 1, Figures 1 and 2, of conventional design except that the bottom 2 thereof is constructed in a novel and characteristic manner, as will hereinafter be described, but I wish it to be understood that the invention is applicable not only to frying pans in a limited sense but to all types of cooking utensils, implements and devices, whether for domestic or commercial purposes, having a frying bottom or other frying member, such as frying pots and frying plates or tables.

The bottom 2 of my novel frying pan, as illustrated in Figures 1 and 2 and on a larger scale in Figure 3 is characteristic in being provided with a multitude of rounded depressions in the upper, frying surface thereof, as indicated at 3, Figure 3, with rounded tops therebetween, as indicated at 4, Figure 3. Preferably, the depressions and tops are arranged in such a manner that the cross sectional shape of the frying surface in all planes perpendicular to the over-all plane thereof takes a wavy form, so that the frying surface as a whole gets an undulated, dimply or rippled appearance substantially similar to that of hammered silverware.

I have found that a frying surface of the above described character offers particular advantages in the frying of food, in that a very uniform frying without scorching can be obtained with a minimum amount of fat and in some cases altogether without fat. Some of the probable reasons for the favourable properties of my improved frying utensil are as follows. When fat is used in the frying process, the depressions in the frying surface will form small fat reservoirs thanks to which the fat will remain substantially uniformly distributed over the whole of the frying surface even though the frying pan may be tilted more or less. Whether fat is used or not, any flat contact of the food with the frying surface is avoided. In this connection it should be noted that such flat contact, even over small areas is exactly what forms the greatest danger of scorching. On the other hand, the supporting of the food on rounded tops of the frying surface, according to the invention, so as to avoid flat contact, acts as a protection against scorching. At the same time, the dimples between the tops are effective as a kind of small concave mirrors to radiate heat towards the surface of the food being fried, and the whole arrangement of depressions and tops results in an enlargement of the heat transfer surface of the frying bottom so that frying may be performed at a somewhat lower temperature of the frying surface than heretofore.

Thanks to the improved heat transfer properties, and to further reduce the danger of scorching and improve the uniformity of the heat distribution over the frying surface, it is also possible, according to the invention, to use a frying surface having a coating of reduced heat conductivity. This is illustrated in Figures 5 and 6 where 5 indicates the frying bottom proper, consisting of a suitable metal, and 6 a coating of less heat conductivity than the said metal and consisting for example of a suitable enamel. Figure 5 illustrates the case, where the dimples are formed in the metallic surface of the frying bottom prior to the coating thereof with an enamel, while in Figure 6 the dimples are formed exclusively in the enamel. Obviously, also any compromise between these two extreme cases are imaginable.

While I do not wish to limit myself to any specific dimensions of the rounded depressions and tops, I may mention that it has been found in practice that both in the case of metallic and enamelled surfaces good results are in most cases obtainable with depressions having a depth of approximately $1/25$ inch or less and a diameter of about $1/8$–$3/8$ inch. The manner in which the depressions are produced is immaterial, as any known or suitable process may be used for this purpose such as casting, molding, stamping, hammering etc. The bottom surface of the frying pan may be constructed with bosses opposite the depressions of the frying surfaces as indicated at 7, Figure 4, though I prefer to construct the frying pan with a flat bottom surface as illustrated in Figures 1-3.

Suitable materials for the frying pan, and more particularly for the frying bottom thereof, are, by way of example, metals such as iron, steel and aluminum, and also heat resisting china earthenware, pottery, and clay such as fireclay, and heat resisting glass such as Pyrex glass.

In the case of aluminum, I may provide the frying surface with a coating of reduced heat conductivity, as above referred to, in a particularly advantageous manner, viz. by anodically oxidizing the aluminum on the surface thereof. The coating produced in this manner may take a form similar to that shown in Figures 5 and 6. Since the coating formed on an aluminum surface by anodic oxidizing grows up from the said surface in the form of tapering crystals, a coating formed in this manner will of itself to some extent take the form of a rippled surface, as provided according to the invention, though of course with dimensions of a quite different order than above referred to. Tests have shown that in spite of these differences some of the advantages of the invention are also obtained by the use of a plain anodically oxidized aluminum surface.

This embodiment of the invention is diagrammatically illustrated in Figure 7.

It is to be understood that when reference is made, in this specification, to aluminum, this term is meant to include not only chemically pure aluminum but also such aluminum alloys as have the same general properties as aluminum, particularly as regards lightness of weight and anodic oxidizability.

While I have shown and described certain forms of my invention, it is to be understood that many modifications may be made therein without departing from the spirit thereof.

I claim:

A cooking utensil having a frying surface provided with a plurality of rows of rounded depressions with adjacent rows having the depressions staggered relative to each row, and a plurality of rows of rounded tops with adjacent rows having the rounded tops staggered relative to each row, and the rows of rounded tops alternating and staggered with the rows of depressions so that any cross-section of said frying surface in all planes perpendicular to the overall plane thereof is of wave-shaped configuration.

KARL KRISTIAN KOBS KROYER.

REFERENCES CITED

The following references are of record in the file of this patent:

UNITED STATES PATENTS

| Number | Name | Date |
| --- | --- | --- |
| 1,216,973 | Epprecht | Feb. 20, 1917 |
| 1,757,989 | Acton | May 13, 1930 |
| 2,174,425 | Schlumbohm | Sept. 26, 1939 |

FOREIGN PATENTS

| Number | Country | Date |
| --- | --- | --- |
| 220,792 | Great Britain | Aug. 28, 1924 |
| 833,229 | France | July 18, 1938 |
| 543,735 | Great Britain | Mar. 10, 1942 |